April 19, 1966  H. BATSCH  3,247,404
ELECTRO-MECHANICAL TRANSDUCER
Filed Feb. 13, 1958
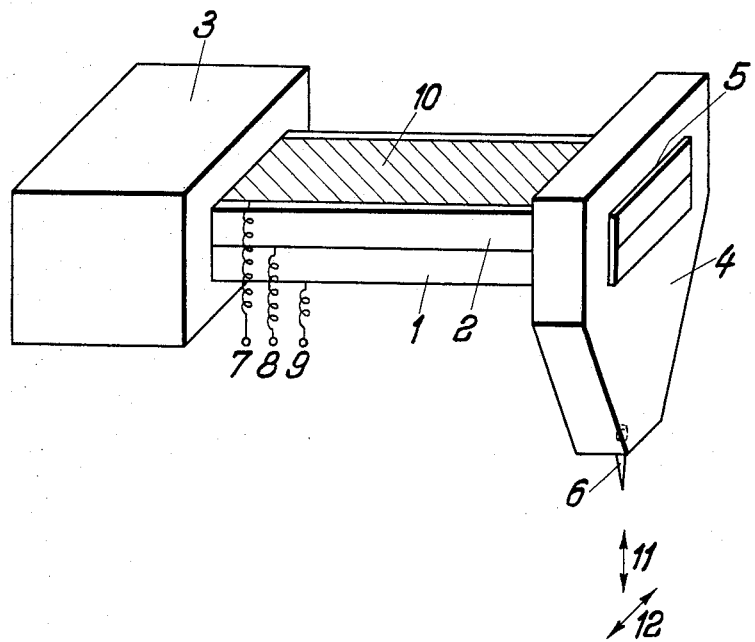
Inventor:
HELMUT BATSCH
By: Eric D. Frankel
PATENT AGENT 3,247,404
ELECTRO-MECHANICAL TRANSDUCER
Helmut Batsch, Hannover, Germany, assignor to
Telefunken G.m.b.H., Berlin, Germany
Filed Feb. 13, 1958, Ser. No. 715,140
Claims priority, application Germany, Feb. 23, 1957,
T 13,267
1 Claim. (Cl. 310—8.6)

It is well known that electric charges occur on the surface of some crystals when mechanical forces are exerted on said crystals in predetermined directions. The Seignette salt (Rochelle salt) which is not to be found in the nature exhibits this so-called piezoelectric phenomenon. Artificially grown crystals of the Seignette salt are used to manufacture electromechanical transducers by cutting out and bonding together rectangular crystal plates having the accurate, predetermind orientation. These plates are provided on both sides with electrodes made of thin tin or aluminium foils or sprayed coatings.

Selection of orientation depends on the crystal structure; in order to characterise orientation the crystal is associated to a spatial, right-angle X–Y–Z coordinate system wherein the X-axis is the electrical axis, the Y-axis, the mechanical axis and the Z-axis, the optical axis. A bending sensitive transducer is obtained by means of the so-called 45° X-cut, which consists in cutting out plates located in the Y–Z plane and having side faces at 45° with the crystal axes Y and Z. If such a plate is clamped at one end and bent in the direction of the X-axis at the other, free end, the portion above the symmetry plane is compressed and the lower portion is drawn, so that with respect to the symmetry plane electric charges of different signs occur on the surfaces. One such plate cannot be used as a transducer since the neutral layer is symmetrical in the plate, so that on bending, the resulting voltage at the electrodes is zero. Therefore two plates of equal thickness are bonded together by gluing so that under bending stress one plate is only elongated, the other plate is only shortened. If both plates have the same orientation an electric voltage is obtained between the interconnected outer electrodes on the one hand and the common electrode between the plates on the other hand.

For a twisting sensitive transducer the so-called X-cut is selected, whereby the two plates are cut out of the Y–Z plane of the crystal, while their side faces are parallel to the Y and Z axes respectively. The plate assembly is clamped either at three corners or, like the bending sensitive transducer, at one end thereof. To produce an electric voltage across the electrodes, in the first case the free corner must be bent in the direction of the X-axis and in the second case the free end must be twisted.

For simultaneously recording or reproducing a two-coordinate cut with perpendicular directions of motion into or from the groove of a disc record, there is needed a transducer which, on application of two voltages, causes the stylus to be moved in said two directions, or on deflection of said stylus in said two directions, causes two individual voltages to be generated. Such a piezoelectric transducer is already known wherein there are used either two double plates of the bending sensitive type or two double plates of the twisting sensitive type, said two double plates being arranged perpendicular to each other. Their free ends are connected together via coupling elements to which the stylus is attached.

The invention shows a transducer having a substantially simpler structure and requiring no coupling members between both systems. According to the invention the transducer comprises two plates of piezoelectric material clamped at one end thereof and bonded together after applying an electrode therebetween and two outer electrodes, said plates being so differently orientated that on bending the free end thereof, an electric voltage is set up only across the electrodes of one plate and on twisting said free end, an electric voltage is set up only across the electrodes of the other plate, or vice versa, on application of two voltages, the corresponding deflections are produced.

Thus, in the transducer according to the invention, only one double-plate is necessary so that, considering moreover that no coupling member is needed, the movable assembly is much smaller than in the known transducer. As a result, a greater sensitivity can be obtained, particularly at high frequencies.

Operation will be clearly understood with reference to the drawing which shows schematically a transducer system according to the invention for a pickup device. The two rectangular crystal plates 1 and 2 are glued together and attached at one end to a clamping unit 3. The free end of the plates remote from said unit is attached to a member 4. The member 4 is provided with a rectangular hole 5 through which the free ends of both plates are slid and secured therein either by clamping or by gluing. The stylus projects out of the member 4 at the lower end thereof. The member 4 may be made of rubber or synthetic moulding compound and is used to transfer stylus deflections to both crystal plates while the record is being reproduced. Metal coatings used as electrodes are deposited as known on the four surfaces of the plates 1 and 2, the upper coating 10 of plate 2 being represented in the drawing. Conductors 7, 8, 9 for taking up voltages are connected to said coatings. According to the invention the plates 1 and 2 are orientated differently, namely the plate 2 being obtained from a 45° X-cut and the plate 1 from an X-cut; in other words, the plate 2 is polarised by bending and the plate 1 is polarised by twisting. The transducer performance is not varied when the plates 1 and 2 are interchanged.

When the stylus 6 is moved in the direction of the arrow 11 during the reproduction of sound recorded in a hill and dale cut of a disc record, the free ends of plates 1 and 2 are moved vertically. Since the interface between both plates is so arranged as to form simultaneously the neutral layer of the assembly, one of the plates is elongated while the other is shortened. As only the plate 2 is bending sensitive, a voltage can be derived from the terminals 7 and 8. Because of its different orientation bending of the plate 1 has no effect and thus no voltage occurs across the terminals thereof. If the stylus is moved in the direction of the arrow 12 during reproduction of sounds recorded in a lateral cut, the plates 1 and 2 are twisted. However a voltage is set up only across the coatings of the plate 1, that is, between the terminals 8 and 9.

In a similar manner the illustrated transducer can be used for recording a two-coordinate record by applying for example binaural signals to the terminals 7, 8 or 8, 9. Another application of the invention can be found in measuring machine vibrations.

I claim:
An electromechanical transducer comprising two rectangular plates of electromechanically active material, said plates being bonded together in congruent superposition to form a unit, one of said plates having an extensional mode response associated with electric potential differences between its major surfaces and the other in a face shear mode response associated with electrical potential differences between its major surfaces; an electrode interposed between said plates; an electrode on the exposed major surface of each of said plates forming two electrode pairs having said interposed electrode in common; mechanical coupling means motion of which in one fashion is associated with a flexural distortion of said unit and in another fashion is associated with torsional distortion of said unit; and individual electrical connections to each of said electrodes.

References Cited by the Examiner

UNITED STATES PATENTS 2,478,223   8/1949   Argabrite _____ 310—9.7

ORIS L. RADER, *Primary Examiner.*

SIMON YAFFEE, E. JAMES SAX, MILTON O. HIRSHFIELD, *Examiners.*